United States Patent [19]
Harman

[11] 3,730,553
[45] May 1, 1973

[54] FRONT FORK ASSEMBLY FOR TWO WHEEL VEHICLES

[76] Inventor: John W. Harman, 501 Elefa Street, Roseville, Calif. 95678

[22] Filed: Nov. 17, 1971

[21] Appl. No.: 199,642

[52] U.S. Cl. ..............................280/277, 280/279
[51] Int. Cl. .............................................B62k 21/02
[58] Field of Search..................280/276, 277, 275, 280/285, 286, 279

[56] References Cited

UNITED STATES PATENTS

| | | | |
|---|---|---|---|
| 940,245 | 11/1909 | Gates | 280/276 |
| 1,485,935 | 3/1924 | MacLean | 280/277 |
| 1,189,874 | 7/1916 | Schickel | 280/277 |

FOREIGN PATENTS OR APPLICATIONS

| | | | |
|---|---|---|---|
| 510,081 | 11/1920 | France | 280/277 |
| 102,453 | 10/1922 | Switzerland | 280/277 |

Primary Examiner—Kenneth H. Betts
Assistant Examiner—John McCormack
Attorney—Alexander B. Blair

[57] ABSTRACT

A front fork assembly for two wheel vehicles such as motorcycles and bicycles which includes a pair of tubular trusses arranged in spaced parallel relation and joined by a handle bar on the upper end thereof. The truss members are joined adjacent their upper end by a triple clamp assembly for connecting the forks to the frame of the two wheel vehicle. A forwardly extending transversely pivoted wheel support member is pivotally mounted on the lower end of each of said forks and joined by an axle for supporting the front wheel. A sprung support is adjustably secured to the rear end of the wheel support member with the spring located within the tubular truss member.

5 Claims, 4 Drawing Figures

PATENTED MAY 1 1973 3,730,553
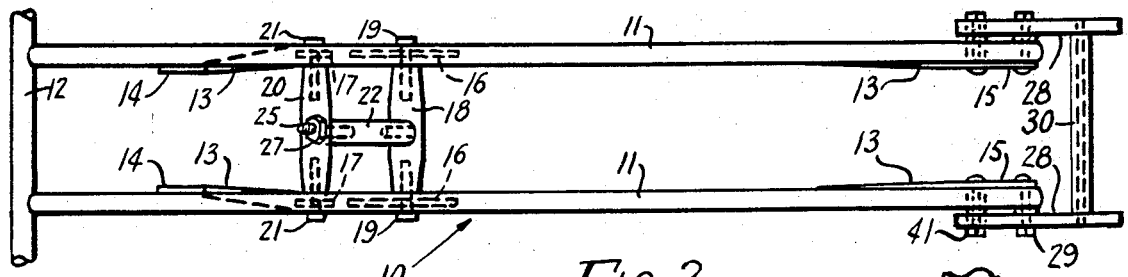
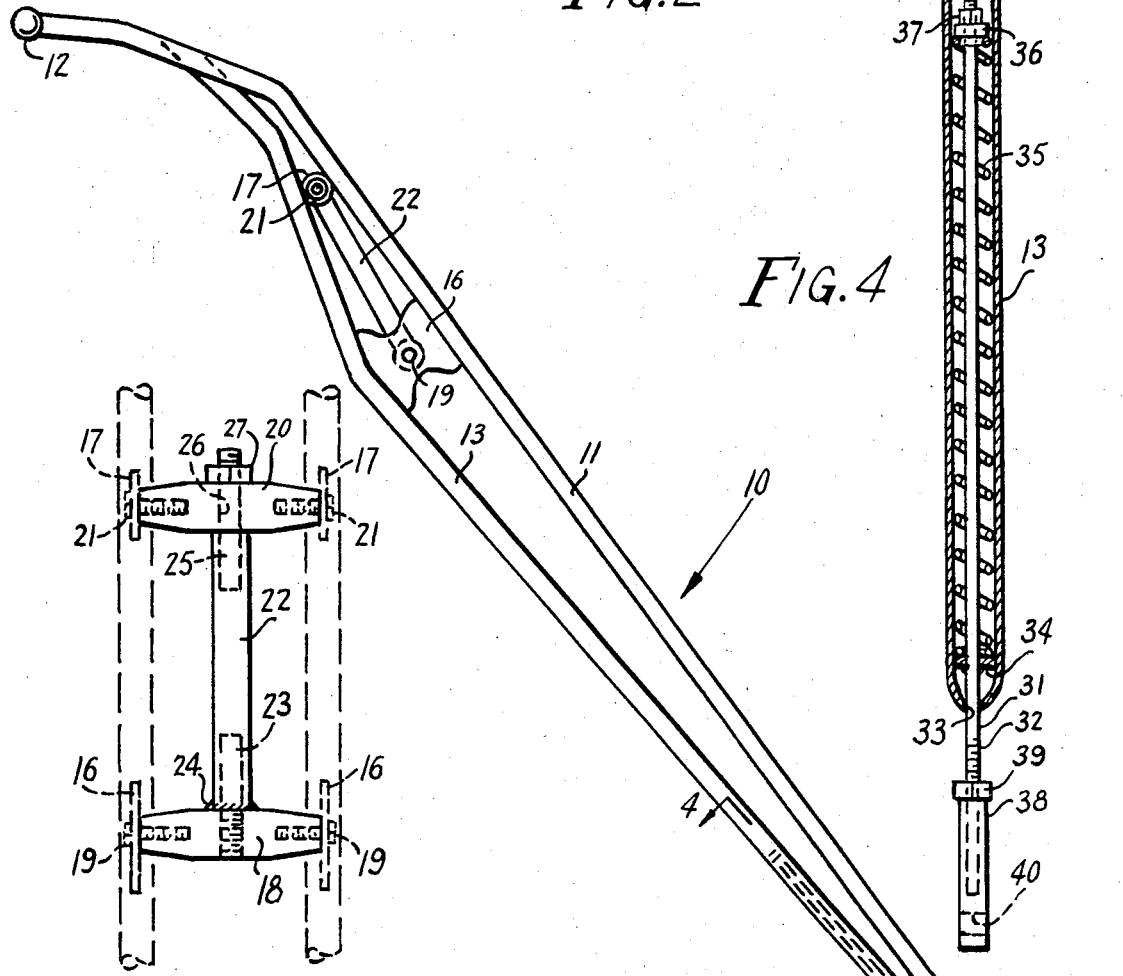
INVENTOR.
JOHN W. HARMAN
BY
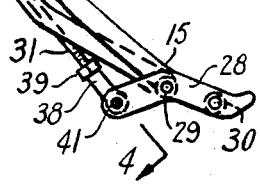
ATTORNEY.

FRONT FORK ASSEMBLY FOR TWO WHEEL VEHICLES

BACKGROUND OF THE INVENTION

1. Field of the Invention

The invention relates to the front fork for supporting and steering a single front wheel of a vehicle.

2. Summary of the Invention

The front fork includes a pair of spaced parallel tubular truss members connected by a handle bar at their upper end and by a triple clamp adjacent their upper end for connecting the fork to the frame of the vehicle. The lower end of the fork has a sprung wheel support pivotally mounted thereon and connected to a compression spring through an adjustable linkage.

The primary object of the invention is to provide a front fork for a vehicle which will permit the front wheel to be spaced considerably ahead of the frame and will spring mount the front wheel for a more comfortable ride.

Other objects and advantages will become apparent in the following specification when considered in the light of the attached drawings.

FIG. 1 is a side elevation of the invention;

FIG. 2 is a top plan view of the invention;

FIG. 3 is a fragmentary front elevation of the triple clamp; and

FIG. 4 is an enlarged fragmentary longitudinal cross-section taken on the line 4—4 of FIG. 1 looking in the direction of the arrows.

DESCRIPTION OF THE PREFERRED EMBODIMENT

Referring now to the drawings in detail wherein like reference characters indicate like parts throughout the several figures the reference numeral 10 indicates generally a front fork assembly for supporting the single front wheel of a vehicle such as a motorcycle or bicycle.

The front fork 10 includes a pair of elongate tubular members 11 secured to a handle bar 12 at their upper ends. A second tubular member 13 is welded at 14 to the tubular member 11 near the handle bars 11 and diverges rearwardly therefrom and then forwardly meeting the tubular member 11 at its lower end which is welded at 15.

A plate 16 extends between and is welded to the tubular members 11, 13 intermediate the upper and lower ends thereof and a second plate 17 extends between and is welded to the tubular members 11, 13 at a point spaced above the plate 16. A shaft 18 extends between the plates 16 and is secured thereto by bolts 19 which extend through the plates 16 and axially into opposite ends of the shaft 18. A second shaft 20 extends between the plates 17 and is secured thereto by bolts 21 which extend through the plates 17 and axially into the shaft 20. The shaft 22 is positioned intermediate the spaced parallel tubular members 11 as can be seen in FIG. 2 and is mounted on a threaded shaft 23 on its lower end which is threaded through the shaft 18 and is further secured thereto by welding 24.

A threaded shaft 25 extends upwardly from the shaft 22 through a bore 26 in the shaft 20. A nut 27 on the shaft 25 clamps the shaft 20 and the shaft 22 together. The shaft 22 is adapted to be journaled in the forward end of the frame of the vehicle for rotation about its axis and can be assembled thereto by removing the nut 27, bolts 21 and shaft 20 which are replaced to secure the fork 10 to the frame.

A pair of wheel support arms 28 are mounted intermediate their opposite ends on pivot bolts 29 which extend through the lower ends of the tubular members 11, 13 and are axially aligned. A shaft 30 rigidly connects the arms 28 to journal the front wheel of the vehicle thereon and to maintain the arms 28 in aligned relation.

A shaft 31 having its lower end threaded at 32 extends up into the tubular member 13 through a bore 33 formed therein. A spring seat 34 is rigidly mounted in the tubular member 13 to support a compression coil spring 35 in the tubular member 13. A washer 36 is positioned in engagement with the upper end of the spring 35 and a nut 37 threaded onto the upper end of the shaft 31 secures the washer 36 thereon. A member 38 is threaded onto the threaded portion 32 of the shaft 31 and is retained thereon by a jamb nut 39. A bore 40 in the lower end of the member 38 receives a pivot 41 which extends through the rear end of the arm 28.

In the use and operation of the invention the fork 10 is mounted on the frame of a motorcycle or bicycle and a front wheel is journaled on the shaft 30. As the front wheel encounters uneven road surfaces it will cause the arms 28 to swing upwardly at their forward ends drawing the shafts 31 downwardly to compress the springs 35. By moving the member 38 on the shaft 31 the tension on the spring 35 may be adjusted as desired.

The truss structure of the tubular members 11, 13 provides an extremely strong fork support for the front wheel while maintaining a relative low weight.

Having thus described the preferred embodiment of the invention it should be understood that numerous structural modifications and adaptations may be resorted to without departing from the spirit of the invention.

I claim:

1. A front fork assembly for vehicles of the type having a single front wheel and a frame comprising a pair of spaced parallel tubular members, a second pair of spaced parallel tubular members rigidly secured to said first pair of tubular members at the upper and lower ends thereof and spaced therefrom to form a pair of spaced parallel trusses, a shaft for pivotally mounting said fork assembly to said frame, means mounting said shaft to said fork assembly intermediate the opposite sides thereof, a pair of wheel support arms transversely pivotally mounted to the lower end of said tubular members, means on said arms for journaling the front wheel of a vehicle at the front ends thereof, and means in the second of said tubular members extending outwardly therefrom and connected to the rear ends of said arms for spring mounting said arms for pivotal movement on the lower ends of said tubular members.

2. A device as claimed in claim 1 wherein handle bars rigidly connect the upper ends of said first named pair of tubular members.

3. A device as claimed in claim 1 wherein said first named shaft is supported on a pair of shafts extending between said tubular members perpendicularly to said first named shaft.

4. A device as claimed in claim 1 wherein the means spring mounting said arms is adjustable.

5. A device as claimed in claim 4 wherein the means spring mounting said arms includes a pair of spaced parallel compression springs.

* * * * *